(12) United States Patent
Fisher

(10) Patent No.: US 6,233,914 B1
(45) Date of Patent: May 22, 2001

(54) METHOD OF AN APPARATUS FOR PRODUCING POWER HAVING A SOLAR REFORMER AND A STEAM GENERATOR WHICH GENERATE FUEL FOR A POWER PLANT

(75) Inventor: Uriyel Fisher, Haifa (IL)

(73) Assignee: Ormat Industries Ltd., Yavne (IL)

( * ) Notice: Subject to any disclaimer, the term of this patent is extended or adjusted under 35 U.S.C. 154(b) by 0 days.

(21) Appl. No.: 08/903,982

(22) Filed: Jul. 31, 1997

(51) Int. Cl.[7] ............................................. F02B 43/00
(52) U.S. Cl. .................. 60/39.02; 60/39.07; 60/39.12; 60/39.182
(58) Field of Search ................... 60/39.02, 39.07, 60/39.12, 39.465, 39.181, 39.182

(56) References Cited

U.S. PATENT DOCUMENTS

| | | | |
|---|---|---|---|
| 3,462,948 | * | 8/1969 | Scholz .................................. 60/39.02 |
| 4,799,357 | * | 1/1989 | Hanrahan et al. ....................... 60/673 |
| 5,669,216 | * | 9/1997 | Ankersmit et al. .................. 60/39.02 |

OTHER PUBLICATIONS

Epstein, M. "Solar Fuels and Chemicals at the WIS," (abstract), presented at Sun Day Symposium "From Basic Research to Industry" ed. by Pinhas Doran, May 1996.

Epstein, M. "Solar Thermochemistry Activities at the Weizmann Institute of Science (WIS)," presented at Sun Day Symposium "From Basic Research to Industry" ed. By Pinhas Doran, May 1996.

* cited by examiner

Primary Examiner—Charles G. Freay
(74) Attorney, Agent, or Firm—Nath & Associates PLL; Gary M. Nath; Jerald L. Meyer

(57) ABSTRACT

According to the present invention, a method and apparatus are provided for producing power from a hydrocarbon fuel and water vapor heated in a solar reformer to form hydrogen and carbon monoxide. The method provides the following steps: supplying the hydrogen and carbon monoxide from the solar reformer to a steam generator for producing steam and heat depleted hydrogen and carbon monoxide; supplying exhaust gases from the exhaust of a gas turbine to the steam generator; supplying the steam to a superheater for producing superheated steam; supplying the heat depleted hydrogen and carbon monoxide from the steam generator to a preheater for preheating the hydrocarbon fuel prior to supplying the hydrocarbon fuel to the solar reformer and producing preheated hydrocarbon fuel and further heat depleted hydrogen and carbon monoxide; adding the superheated steam to the preheated hydrocarbon fuel prior to supplying the preheated hydrocarbon fuel to the solar reformer; and supplying the further heat depleted hydrogen and carbon monoxide to a Rankine cycle power plant for producing power and cooled and dried hydrogen and carbon monoxide. In addition, the present invention includes providing apparatus for carrying the above-mentioned method steps of the present invention.

20 Claims, 1 Drawing Sheet

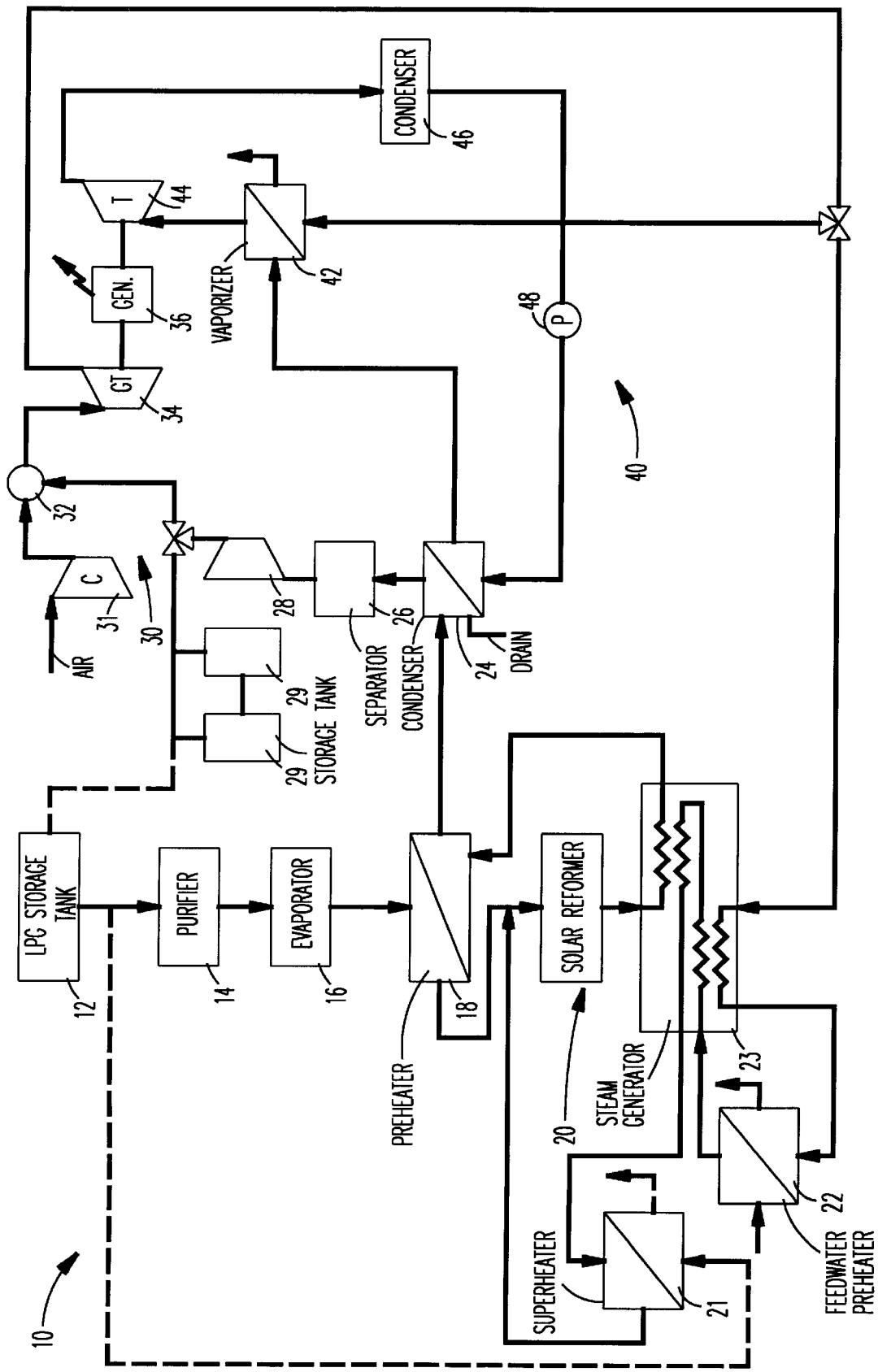

METHOD OF AN APPARATUS FOR PRODUCING POWER HAVING A SOLAR REFORMER AND A STEAM GENERATOR WHICH GENERATE FUEL FOR A POWER PLANT

TECHNICAL FIELD

This invention relates to a method of and apparatus for producing power, and more particularly to a method of and apparatus for producing power using a reformer for heating a hydrocarbon fuel and water vapor to form hydrogen and carbon monoxide which are used for producing power through use of a gas turbine in a combined cycle or together with a cogeneration system.

BACKGROUND OF THE INVENTION

In the last few years different schemes have been proposed for producing power from hydrocarbon fuels. In addition, lately several schemes for producing power from solar energy have been considered. Both types of schemes have had relatively low levels of efficiency.

It is therefore an object of the present invention to provide a new and improved method of and means for producing power which substantially overcomes or significantly reduces the disadvantages outlined above.

BRIEF DESCRIPTION OF THE INVENTION

In accordance with the present invention, a method is provided for producing power from a hydrocarbon fuel and water vapor heated in a solar reformer to form hydrogen and carbon monoxide comprising the steps of: supplying the hydrogen and carbon monoxide from said solar reformer to a steam generator for producing steam and heat depleted hydrogen and carbon monoxide; supplying exhaust gases from the exhaust of a gas turbine to said steam generator; supplying said steam to a superheater for producing superheated steam; supplying said heat depleted hydrogen and carbon monoxide from said steam generator to a preheater for preheating said hydrocarbon fuel prior to supplying the hydrocarbon fuel to said solar reformer and producing preheated hydrocarbon fuel and further heat depleted hydrogen and carbon monoxide; adding said superheated steam to said preheated hydrocarbon fuel prior to supplying said preheated hydrocarbon fuel to said solar reformer; and supplying said further heat depleted hydrogen and carbon monoxide to a Rankine cycle power plant for producing power and cooled and dried hydrogen and carbon monoxide. According to the present invention the cooled and dried hydrogen and carbon monoxide are supplied to a separator for separating water vapor condensate from said cooled and dried hydrogen and carbon monoxide and producing further dried hydrogen and carbon monoxide. The further dried hydrogen and carbon monoxide are then supplied to a compressor for producing compressed hydrogen and carbon monoxide which is furnished to the combustion chamber of the gas turbine. In accordance with the present invention, the step of supplying the further heat depleted hydrogen and carbon monoxide to a Rankine cycle power plant for producing power can be carried out by supplying the further heat depleted hydrogen and carbon monoxide to a power plant having a steam turbine. Alternatively, this step can be carried out by supplying the further heat depleted hydrogen and carbon monoxide to a power plant having an organic vapor turbine.

Moreover, the present invention comprises providing apparatus for carrying the above-mentioned method steps of the present invention. An embodiment of such apparatus comprises: a steam generator for producing steam and heat depleted hydrogen and carbon monoxide from hydrogen and carbon monoxide supplied from said solar reformer; a gas turbine for producing power and from which exhaust gases exit and supply means for supplying said exhaust gases from the exhaust of a gas turbine to said steam generator; a superheater for producing superheated steam from said steam; a preheater for preheating said hydrocarbon fuel prior to supplying the hydrocarbon fuel to said solar reformer and producing preheated hydrocarbon fuel and further heat depleted hydrogen and carbon monoxide from said heat depleted hydrogen and carbon monoxide supplied from said steam generator; means for adding said superheated steam to said preheated hydrocarbon fuel prior to supplying said preheated hydrocarbon fuel to said solar reformer; and a Rankine cycle power plant for producing power and cooled and dried hydrogen and carbon monoxide from said further heat depleted hydrogen and carbon monoxide.

BRIEF DESCRIPTION OF THE DRAWINGS

Embodiments of the present invention are described by way of the example with reference to the accompanying drawing wherein the FIGURE is a block diagram which represents, in a schematic way an embodiment of the present invention.

DETAILED DESCRIPTION

Referring now to the FIGURE, reference numeral 10 designates apparatus for producing power in accordance with the present invention wherein a hydrocarbon e.g. methane, natural gas, liquid petroleum gas (LPG), etc. stored in storage tank 12 is supplied via purifier 14, evaporator 16 and preheater 18 to solar reformer 20. In solar reformer 20, the LPG together with superheated steam supplied from superheater 21 is heated by solar energy for producing hydrogen and carbon monoxide in the presence of water vapor or steam. Heat is provided to superheater 21 at start-up by combustion of LPG supplied from LPG storage tank 12 and during operation of the apparatus 10 if necessary. The hydrogen and carbon monoxide formed together with steam present are supplied via steam generator 23 and preheater 18 to condenser 24 for condensing water vapor present with the hydrogen and carbon monoxide and producing cooled and dried hydrogen and carbon monoxide and water condensate which drains into a drain. Thereafter, the cooled and dried hydrogen and carbon dioxide can be supplied to separator 26 for further separating water droplets from the cooled and dried hydrogen and carbon monoxide and producing further dried hydrogen and carbon monoxide. The further dried hydrogen and carbon monoxide are supplied to compressor 28 for raising their pressure and storing the pressurized further dried hydrogen and carbon dioxide in storage tanks 29 or, if needed, for supplying the pressurized further dried hydrogen and carbon dioxide to gas turbine unit 30 for combustion in combustion chamber 32 contained in the gas turbine unit. If preferred, depending on the mode of operation, only portion of the further dried hydrogen and carbon dioxide can be supplied to combustion chamber 32 with the remainder being supplied to storage tanks 29. This stored gas can be used by the turbine for producing power at other times and also even when the solar reformer is not operating. Furthermore, if needed or when the solar reformer is not operating, LPG can be supplied from LPG storage tank 12 to combustion chamber 32 of gas turbine unit 30 for operating the gas turbine unit and bottoming Rankine power cycle 40.

Gas turbine unit 30 comprises compressor 31 for compressing air, combustion chamber 32 for combusting the hydrogen with the carbon monoxide present and gas turbine 34 for expanding hot gases produced by combustion chamber 32 and producing power via electric generator 36.

Portion of exhaust gases exiting gas turbine 34 are supplied to steam generator 23 for transferring heat contained therein to the water present in steam generator 23 and from which heat depleted exhaust gases exit. These heat depleted exhaust gases are supplied to feedwater preheater 22 for transferring heat to water contained in the feedwater preheater and from which further heat depleted exhaust gases are exhausted to the ambient air.

In addition, portion of exhaust gases exiting gas turbine 34 can be supplied to working fluid vaporizer 42 of bottoming Rankine power cycle 40. In bottoming Rankine power cycle 40, condenser 24 containing working fluid used to extract heat and condense water vapor present together with the hydrogen and carbon monoxide produces heated or preheated working fluid which is supplied to working fluid vaporizer 42 where heat contained in the portion of the exhaust gases supplied from gas turbine 24 is used to produce working fluid vapor. This working fluid vapor is supplied to turbine 44 for producing power via electric generator 36 or a separate electric generator (not shown) if preferred and the expanded working fluid exiting turbine 44 is supplied to working fluid condenser 46 for producing working fluid condensate. Cycle pump 48 pumps working fluid condensate exiting working fluid condenser 46 to condenser 24 thus completing power cycle 40. In accordance with the present invention, the working fluid used in power cycle 40 can be water or an organic working fluid, e.g., pentane, etc.

By operating of the present system, due to the use of hydrogen and carbon monoxide mixture for combustion in combustion chamber 32 rather than methane or LPG, etc., a higher calorific value of the fuel combusted is achieved. Not only that but furthermore, the amount of pollution produced per unit fuel, e.g., $NO_x$ will be reduced.

In addition, while the above description discloses a bottoming Rankine power cycle, if preferred, a cogeneration system can be used instead such that heat contained in portion of the exhaust gases of gas turbine unit 30 can be used to produce steam for example for supplying to industrial or other needs, e.g., process steam, process heating, etc. Furthermore, the heat or portion thereof can be used for desalination for producing desalinated water.

As an example of the operation of the present invention, LPG gas stored at approximately 14 to 16 bar in LPG storage tank 12 is supplied via purifier 14 to evaporator 16 using a pump (not shown) to raise the pressure of the LPG to approximately 25 bar, LPG produced by evaporator 16 is supplied to preheater 18 where the temperature of the LPG is raised to approximately 500° C. using heat contained in the hydrogen and carbon monoxide gas present together with water vapor supplied at approximately 600° C. and 12 bar from solar reformer 20. Solar reformer 20 operating at approximately 25 bar produces hydrogen and carbon monoxide and water vapor or steam at about 820° C. which is supplied to preheater 18. Steam generator 23 produces steam at about 3 to 4 bar above the operating pressure of solar reformer 20 ie. approximately 29 bar using heat contained portion of the gas turbine exhaust gases entering steam generator 23 at approximately 540° C. Steam produced by steam generator 23 is supplied to superheater 21 which produces superheated steam at about 500° C. Heat depleted hydrogen and carbon monoxide exiting preheated 18 at approximately 280° C. enters condenser 24 for preheating e.g. liquid organic working fluid entering the condenser at about 35° C. Compressor 28 operates to ensure that the pressure of the further dried hydrogen and carbon monoxide exiting separator 26 is approximately in the range of 12 to 14-bar for supply to combustion chamber 32 of gas turbine unit 30. In this example, a prototype power plant will produce about 450 to 525 kW electric power with gas turbine unit 30 producing approximately 250 to 275 kW continuous electric power and organic Rankine cycle turbine used producing about 200 to 250 kW continuous electric power.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method for producing power from a hydrocarbon fuel and water vapor heated in a solar reformer to form hydrogen and carbon monoxide comprising the steps of:

a. using the hydrogen and carbon monoxide from said solar reformer and exhaust gases from the exhaust of a gas turbine to generate steam that is superheated and producing heat depleted hydrogen and carbon monoxide;

b. supplying said heat depleted hydrogen and carbon monoxide from said steam generator to a preheater for preheating said hydrocarbon fuel prior to supplying the hydrocarbon fuel to said solar reformer and producing preheated hydrocarbon fuel and further heat depleted hydrogen and carbon monoxide;

c. adding said superheated steam to said preheated hydrocarbon fuel prior to supplying said preheated hydrocarbon fuel to said solar reformer; and d. supplying said further heat depleted hydrogen and carbon monoxide to a Rankine cycle power plant for producing power and cooled and dried hydrogen and carbon monoxide.

2. A method according to claim 1 including supplying said cooled and dried hydrocarbon and carbon monoxide to a separator for separating water vapor condensate from said cooled and dried hydrogen and carbon monoxide and producing further dried hydrogen and carbon monoxide.

3. A method according to claim 2 including supplying said further dried hydrogen and carbon monoxide to a compressor for producing compressed hydrogen and carbon monoxide.

4. A method according to claim 3 including supplying said compressed hydrogen and carbon monoxide to the combustion chamber of said gas turbine.

5. A method according to claim 1 wherein the step of supplying said further heat depleted hydrogen and carbon monoxide to a Rankine cycle power plant for producing power is carried out by supplying said further heat depleted hydrogen and carbon monoxide to a power plant having a steam turbine.

6. A method according to claim 1 wherein the step of supplying said further heat depleted hydrogen and carbon monoxide to a Rankine cycle power plant for producing power is carried out by supplying said further heat depleted hydrogen and carbon monoxide to a power plant having an organic vapor turbine.

7. A method according to claim 5 wherein the step of supplying said further heat depleted hydrogen and carbon monoxide to a power plant having a steam turbine is carried out by supplying further heat depleted hydrogen and carbon monoxide to a condenser for condensing water vapor present together with said further heat depleted hydrogen and carbon monoxide containing water for producing dried hydrogen and carbon monoxide and preheated water.

8. A method according to claim 7 including:
 a. supplying said preheated water to working fluid vaporizer for producing steam using heat contained in a portion of said exhaust gases;
 b. supplying said steam to a turbine for producing power and from which expanded steam is extracted; and
 c. supplying said expanded steam to a working fluid condenser for producing steam condensate.

9. A method according to claim 6 wherein the step of supplying said further heat depleted hydrogen and carbon monoxide to a power plant having an organic vapor turbine is carried out by supplying further heat depleted hydrogen and carbon monoxide to a condenser for condensing water vapor present together with said further heat depleted hydrogen and carbon monoxide containing water for producing dried hydrogen and carbon monoxide and preheated organic working fluid.

10. A method according to claim 9 including:
 a. supplying said preheated organic working fluid to organic working fluid vaporizer for producing organic working fluid vapor using heat contained in a portion of said exhaust gases;
 b. supplying said organic working fluid vapor to a turbine for producing power and from which expanded organic working fluid vapor is extracted; and
 c. supplying said expanded organic working fluid vapor to a working fluid condenser for producing organic working fluid condensate.

11. Apparatus for producing power from a hydrocarbon fuel and water vapor heated in a solar reformer to form hydrogen and carbon monoxide comprising:
 a. a steam generator system for producing steam that is superheated and heat depleted hydrogen and carbon monoxide from hydrogen and carbon monoxide supplied from said solar reformer and exhaust gases from the exhaust of a gas turbine;
 b. a preheater for preheating said hydrocarbon fuel prior to supplying the hydrocarbon fuel to said solar reformer and producing preheated hydrocarbon fuel and further heat depleted hydrogen and carbon monoxide from said heat depleted hydrogen and carbon monoxide supplied from said steam generator so that said superheated steam produced by said steam generator system is added to said preheated hydrocarbon fuel prior to supplying said preheated hydrocarbon fuel to said solar reformer; and
 c. a Rankine cycle power plant for producing power and cooled and dried hydrogen and carbon monoxide from said further heat depleted hydrogen and carbon monoxide.

12. Apparatus according to claim 11 including a separator for separating water vapor condensate from said cooled and dried hydrogen and carbon monoxide and producing further dried hydrogen and carbon monoxide from said cooled and dried hydrocarbon and carbon monoxide to a separator.

13. Apparatus according to claim 12 including a compressor for producing compressed hydrogen and carbon monoxide from said further dried hydrogen and carbon monoxide.

14. Apparatus according to claim 13 including means for supplying said compressed hydrogen and carbon monoxide to the combustion chamber of said gas turbine.

15. Apparatus according to claim 11 wherein said Rankine cycle power plant for producing power comprises a power plant having a steam turbine.

16. Apparatus according to claim 11 wherein said Rankine cycle power plant for producing power comprises a power plant having an organic vapor turbine.

17. Apparatus according to claim 15 wherein power plant includes a condenser for condensing water vapor present together with said further heat depleted hydrogen and carbon monoxide containing water for producing dried hydrogen and carbon monoxide and preheated water from said further heat depleted hydrogen and carbon monoxide.

18. Apparatus according to claim 17 including:
 a. a vaporizer for producing steam from said preheated water using heat contained in a portion of said exhaust gases;
 b. a steam turbine for producing power and from which expanded steam is extracted; and
 c. a working fluid condenser for producing steam condensate from said expanded steam.

19. Apparatus according to claim 16 wherein power plant includes a condenser for condensing water vapor present together with said further heat depleted hydrogen and carbon monoxide containing water for producing dried hydrogen and carbon monoxide and preheated organic working fluid from said further heat depleted hydrogen and carbon monoxide.

20. Apparatus according to claim 19 including:
 a. a vaporizer for producing organic working fluid vapor from said preheated organic working fluid using heat contained in a portion of said exhaust gases;
 b. an organic vapor turbine for producing power and from which expanded organic vapor is extracted; and
 c. a working fluid condenser for producing organic working fluid condensate from said expanded organic working fluid vapor steam.

* * * * *